(12) United States Patent
Cheng

(10) Patent No.: US 8,699,230 B2
(45) Date of Patent: Apr. 15, 2014

(54) COMBINED TYPE STORAGE CASE FOR ELECTRONIC DEVICE ACCESSORIES

(75) Inventor: Chin-Hung Cheng, Chino, CA (US)

(73) Assignee: Sky Tech Worldwide, Inc., Chino, CA (US)

( * ) Notice: Subject to any disclaimer, the term of this patent is extended or adjusted under 35 U.S.C. 154(b) by 402 days.

(21) Appl. No.: 13/291,367

(22) Filed: Nov. 8, 2011

(65) Prior Publication Data

US 2013/0114231 A1    May 9, 2013

(51) Int. Cl.
*H05K 7/16*    (2006.01)
*G06F 1/16*    (2006.01)

(52) U.S. Cl.
CPC .................................. *G06F 1/1635* (2013.01)
USPC ........... 361/727; 361/807; 361/730; 361/731; 361/732; 361/724; 174/135

(58) Field of Classification Search
CPC ......... H05K 5/0217; H05K 5/02; H05K 5/00; H05K 5/0013; H05K 5/0204; H05K 5/0239; H05K 5/0256; H05K 5/0004; G06F 1/1633; G06F 1/1635; G06F 1/1656; B65H 75/00; B65H 75/4476; H01R 25/00; H04R 1/1033

USPC ......... 361/807, 727, 730, 731, 732, 724, 756; 242/400.1, 405.1; 381/384; 439/282; 312/334.34, 334.35, 334.31, 334.29, 312/9.3

See application file for complete search history.

(56) References Cited

U.S. PATENT DOCUMENTS

| | | | | | |
|---|---|---|---|---|---|
| 5,890,613 | A | * | 4/1999 | Williams | 220/23.4 |
| 6,111,772 | A | * | 8/2000 | Lee et al. | 363/146 |
| 2003/0058601 | A1 | * | 3/2003 | Hunter | 361/118 |
| 2004/0100776 | A1 | * | 5/2004 | Haas et al. | 361/729 |

* cited by examiner

*Primary Examiner* — Tuan T Dinh
*Assistant Examiner* — Steven T Sawyer
(74) *Attorney, Agent, or Firm* — pattenttm.us

(57) ABSTRACT

A combined type storage case for electronic device accessories has a first case, a second case and a third case. The first case includes a first receptacle and a pivotable first plug. The first receptacle and the first plug are electrically connected with each other and allow an electronic device to be charged. The second case is detachably mounted on the first case and includes a chamber defined inside the second case for receiving 16A third case is detachably mounted on the first case and includes a chamber defined inside the third case for receiving earphones. Therefore, different electronic device accessories can be distinguished clearly to avoid confusion and a user can conveniently take out a desired accessory.

15 Claims, 4 Drawing Sheets

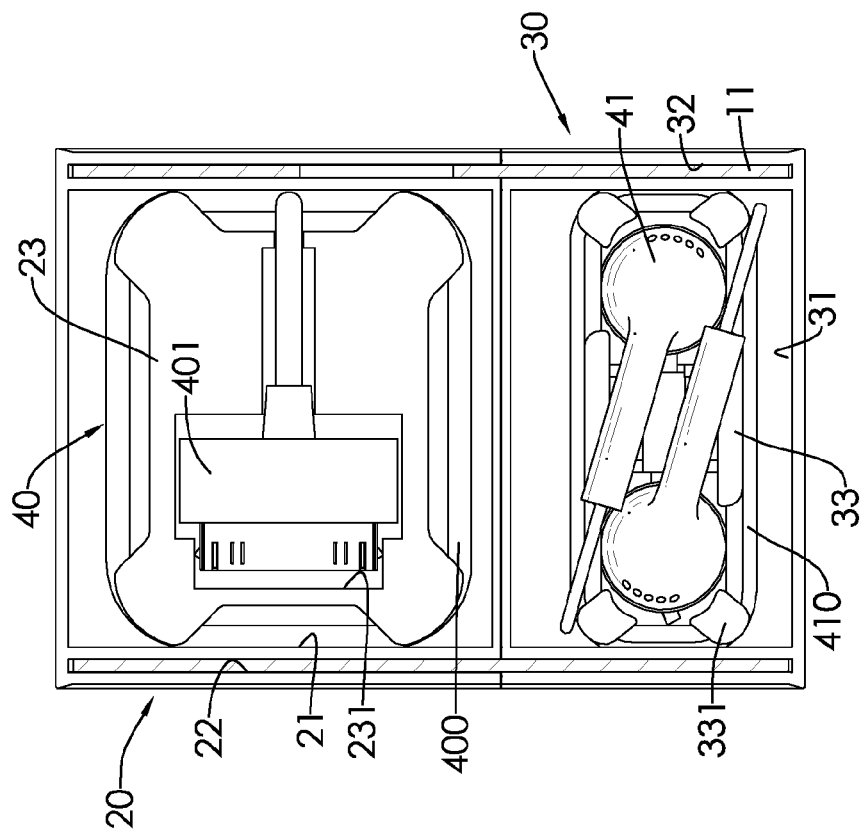
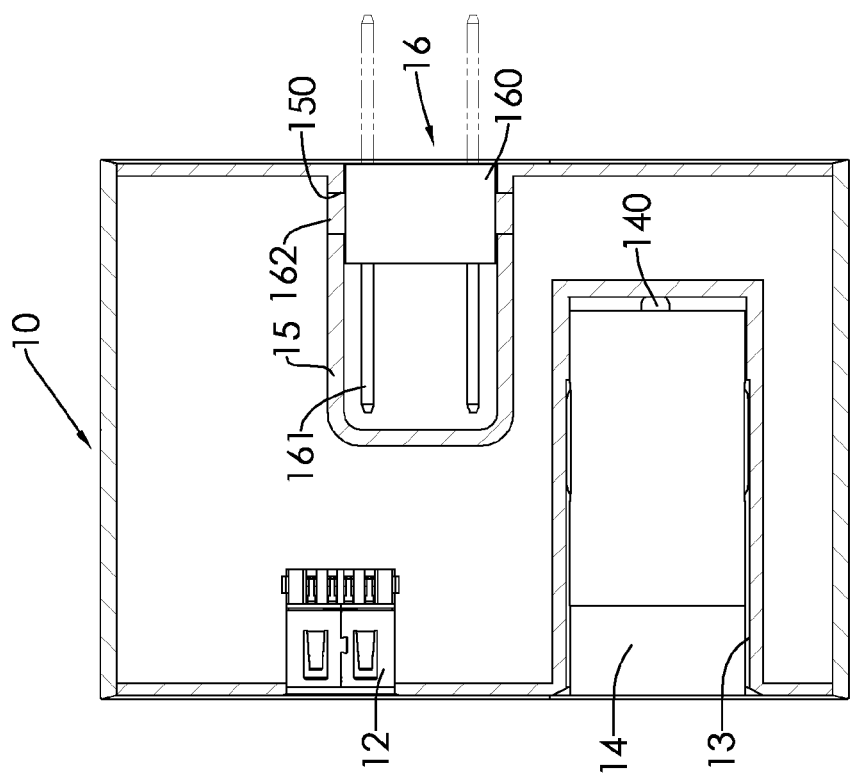

COMBINED TYPE STORAGE CASE FOR ELECTRONIC DEVICE ACCESSORIES

BACKGROUND OF THE INVENTION

1. Field of the Invention

The present invention relates to a storage case, and more particularly to a combined type storage case for receiving various handheld electronic device accessories.

2. Description of the Prior Arts

Handheld electronic devices, such as smart phones, tablet personal computers (tablet PCs), personal digital assistants (PDAs), have become increasingly popular because of their portability and multiple functions they can perform. For instance, they can be connected to earphones to allow users to listen to music, they can be connected to transmission lines to transmit data to computers and also they can be connected to chargers for charging. In order to perform the various functions, the user must carry the electronic device with the earphones, transmission line, charger or other electronic device accessories. Generally, the electronic device accessories are put in the user's bag.

However, the electronic device accessories are dispersedly disposed inside the bag so that the earphone wire and the transmission line will become entangled with each other. The entangled wires and line are inconvenient for the user to use. Besides, the electronic device accessories may be hidden by other objects inside the bag and thus it is inconvenient for the user to take out a desired accessory.

To overcome the shortcomings, the present invention provides a combined type storage case for electronic device accessories to mitigate or obviate the aforementioned problems.

SUMMARY OF THE INVENTION

The main object of the present invention is to provide a combined type storage case for receiving various electronic device accessories.

To achieve the foregoing objective, the combined type storage case for electronic device accessories in accordance with the present invention comprises a first case, a second case and a third case. The first case includes a connecting surface, two first connecting parts, a first receptacle and a first plug. The first connecting parts are respectively formed on two sides of the connecting surface. The first receptacle is formed in the first case. The first plug is pivotally mounted on the first case. The first receptacle and the first plug are electrically connected with each other and allow an electronic device to be charged. The second case is detachably mounted on the first case and includes a chamber, two sides and two second connecting parts. The chamber of the second case is defined inside the second case for receiving a transmission line and has an open top being able to be sealed by the connecting surface of the first case. The second connecting parts are respectively formed on the sides of the second case adjacent to the open top thereof and are detachably connected to the first connecting parts of the first case. The third case is detachably mounted on the first case adjacent to the second case and includes a chamber, two sides and two third connecting parts. The chamber of the third case is defined inside the third case for receiving earphones and has an open top being able to be sealed by the connecting surface of the first case. The third connecting parts are respectively formed on the sides of the third case adjacent to the open top thereof and are detachably connected to the first connecting parts of the first case. Therefore, different electronic device accessories can be distinguished clearly to avoid confusion and provide convenience for a user to take out a desired accessory.

Other objectives, advantages and novel features of the invention will become more apparent from the following detailed description when taken in conjunction with the accompanying drawings.

BRIEF DESCRIPTION OF THE DRAWINGS

FIGS. 3 and 4 are top views in partial section of the storage case in FIG. 1;

DETAILED DESCRIPTION OF THE PREFERRED EMBODIMENTS

Figure 1:
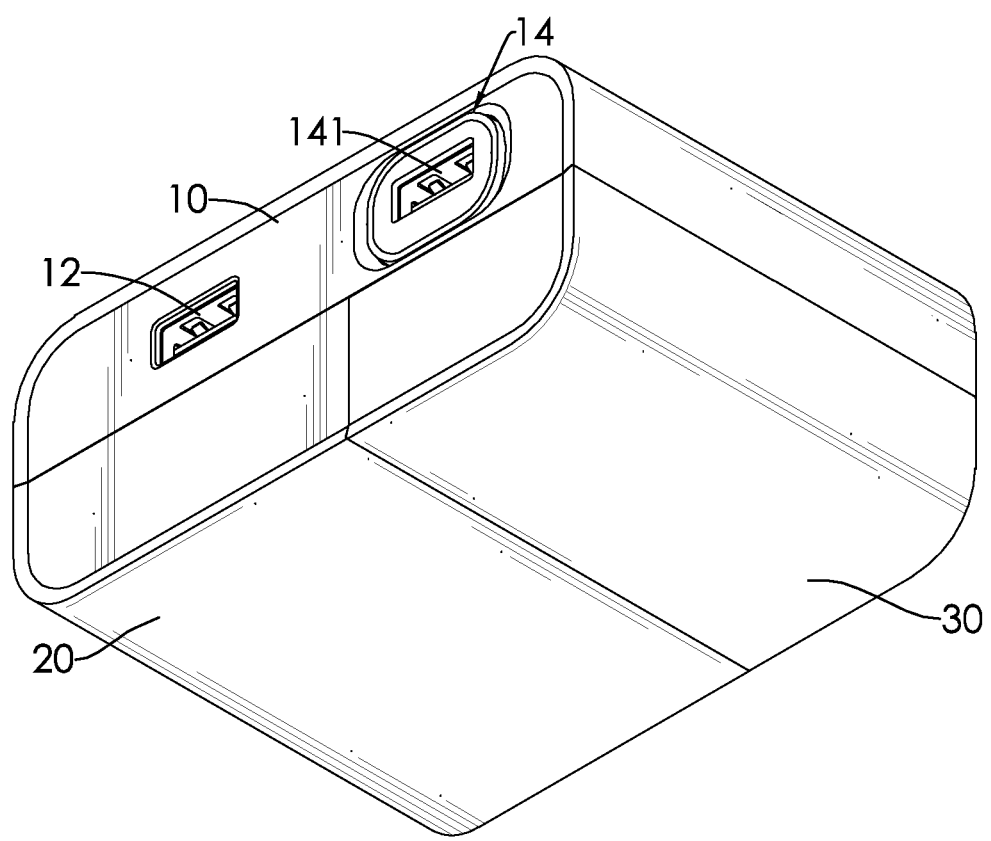
FIG. 1 is a perspective view of a storage case in accordance with the present invention.

With reference to FIG. 1, a combined type storage case for electronic device accessories in accordance with the present invention comprises a first case 10, a second case 20 and a third case 30.

Figure 2:
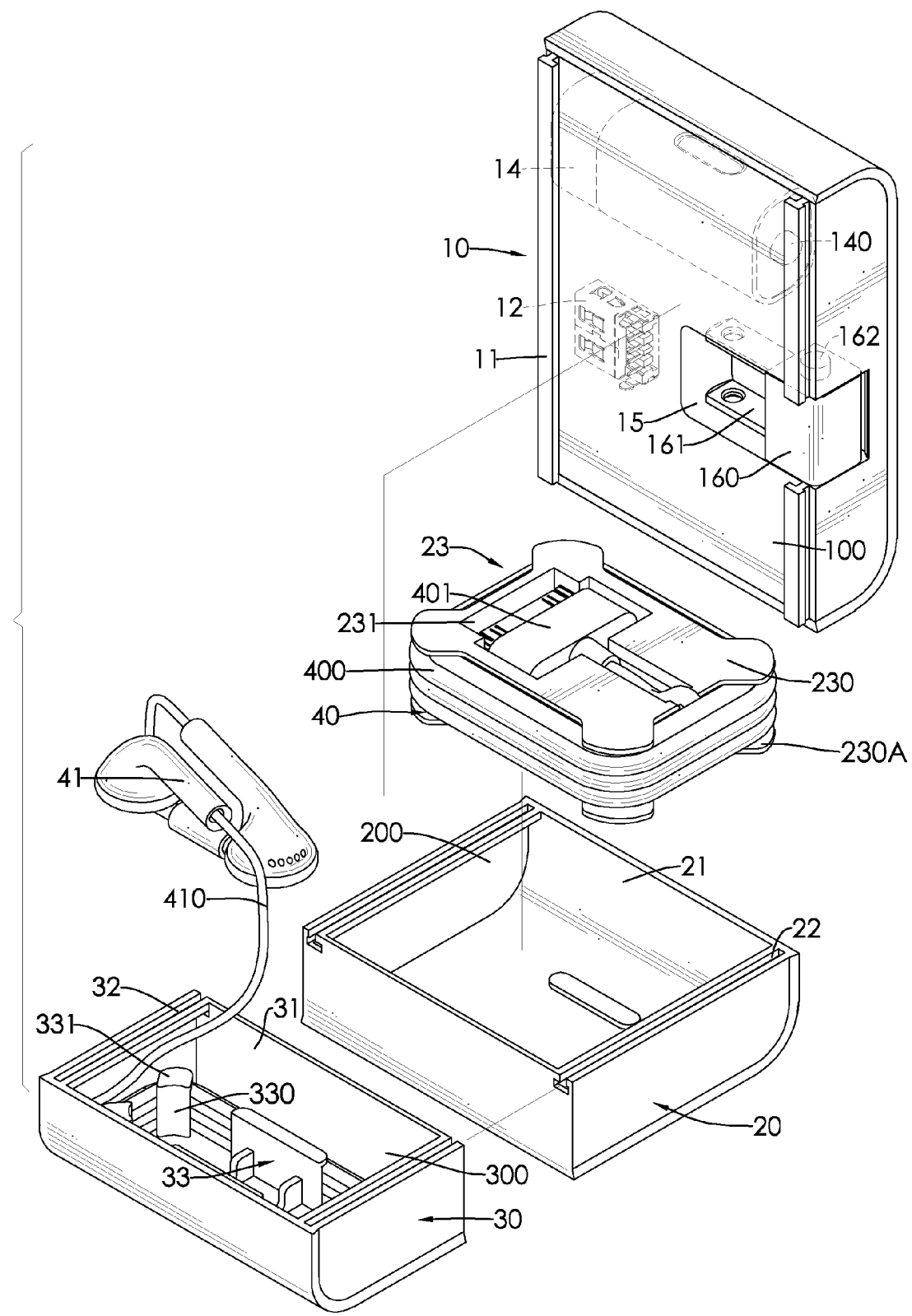
FIG. 2 is an exploded perspective view of the storage case in FIG. 1.

With further reference to FIGS. 2 and 3, the first case 10 includes two side surfaces, a connecting surface 100, two first connecting parts 11, a first receptacle 12, a first receiving recess 15, a first plug 16 and a first transformer. The first connecting parts 11 are respectively formed on two sides of the connecting surface 100. One of the first connecting parts 11 has an elongated protrusion having an axis. The other first connecting part 11 has two elongated protrusions separated at an interval and having an axis. The two axes of the first connecting parts 11 are parallel to each other. The first receptacle 12 is formed in one of the side surfaces of the first case 10. The first receiving recess 15 is formed in the other side surface and the connecting surface 100 of the first case 10 between the two separated first connecting parts 11 and has two opposite recess surfaces and two pivot holes 150. The pivot holes 150 are defined respectively in the recess surfaces of the first receiving recess 15. The first plug 16 is pivotally mounted in the first receiving recess 15 and has two prongs 161 and a rotary base 160. The prongs 161 are mounted on the rotary base 160 and are parallel to each other. The rotary base 160 has two opposite surfaces and two pivots 162. The pivots 162 respectively project from the surfaces of the rotary base 160 and are pivotally received in the pivot holes 150 of the first receiving recess 15 so as to make the prongs 161 disposed in or protruding out of the first receiving recess 15. The first transformer is mounted inside the first case 10 and is electrically connected to the first plug 16 and the first receptacle 12. Preferably, the first receptacle 12 is a Universal Serial Bus (USB) receptacle.

In an embodiment, the first case 10 further includes a second receiving recess 13 and a car charger 14. The second receiving recess 13 is formed in the side surfaces of the first case 10 in which the first receptacle 12 is formed. The car charger 14 is detachably mounted in the second receiving recess 13 and has a second transformer mounted therein. One end of the car charger 14 has a second plug 140 and the other end of the car charger 14 has a second receptacle 141. The second transformer is electrically connected to the second plug 140 and the second receptacle 141. Preferably, the second receptacle 141 is a Universal Serial Bus (USB) receptacle.

With reference to FIGS. 2 and 4, the second case 20 is detachably mounted on the first case 10 and includes a chamber 21, two sides and two second connecting parts 22. The chamber 21 is defined inside the second case 20 for receiving a transmission line 40 of an electronic device and has an open top 200. The open top 200 can be sealed by the connecting surface 100 of the first case 10. The second connecting parts 22 are respectively formed on the sides of the second case 20 adjacent to the open top 200 thereof and are detachably connected to the first connecting parts 11 of the first case 10. Each second connecting part 22 has an elongated groove for slidably receiving at least one corresponding elongated protrusion of a corresponding first connecting part 11 of the first case 10. The chamber 21 of the second case 20 receives a reel block 23 with the transmission line 40. The reel block 23 has a top surface, multiple top positioning segments 230, multiple bottom positioning segments 230A and a positioning recess 231. The positioning recess 231 is formed in the top surface of the reel block 23. A wire 400 of the transmission line 40 can be wound around the reel block 23 and positioned between the top positioning segments 230 and the bottom positioning segments 230A and a plug 401 of the transmission line 40 can be put in the positioning recess 231 for storage.

The third case 30 is detachably mounted on the first case 10 adjacent to the second case 20 and includes a chamber 31, two sides and two third connecting parts 32. The chamber 31 is defined inside the third case 30 for receiving earphones 41 and has an open top 300. The open top 300 can be sealed by the connecting surface 100 of the first case 10. The third connecting parts 32 are respectively formed on the sides of the third case 30 adjacent to the open top 300 thereof and are detachably connected to the first connecting parts 11 of the first case 10. Each third connecting part 32 has an elongated groove for slidably receiving at least one corresponding elongated protrusion of a corresponding first connecting part 11 of the first case 10. The chamber 31 of the third case 30 has a chamber surface and a reel unit 33. The reel unit 33 has multiple protrusions 330. The protrusions 330 respectively extend from the chamber surface of the chamber 31 and each protrusion 330 has a top positioning segment 331. The earphone wire 410 can be wound around the protrusions 330 and positioned below the top positioning segments 331.

With reference to FIGS. 1 and 3, when the electronic device needs to be charged and the electronic device user is indoors, a built-in charging plug or an external power line of the electronic device can be connected to the first receptacle 12 and the second case 20 is then detached from the first case 10 so that the first plug 16 can be pivoted to make the prongs 161 of the first plug 16 protrude out of the first receiving recess 15 to plug into a mains socket. Thus, electrical power can be delivered to the electronic device for charging thereof.

When the electronic device needs to be charged and the electronic device user is in a car, the car charger 14 can be taken out of the second receiving recess 13, the second plug 140 of the car charger 14 is then plugged into a power outlet (e.g. a cigarette lighter receptacle) in the car and the built-in charging plug or the external power line of the electronic device is connected to the second receptacle 141 of the car charger 14. Thus, electrical power can be delivered to the electronic device for charging thereof.

With reference to FIG. 4, the storage case in accordance with the present invention allows the transmission line 40 to be received in the second case 20 and allows the earphones 41 to be received in the third case 30 so that different electronic device accessories can be distinguished clearly to avoid confusion. Besides, the reel block 23 and the reel unit 33 can prevent the earphone wire 410 and the wire 400 of the transmission line 40 from being entangled. Consequently, the storage case provides convenience for the user to take out a desired accessory and store the accessories.

Figure 5:
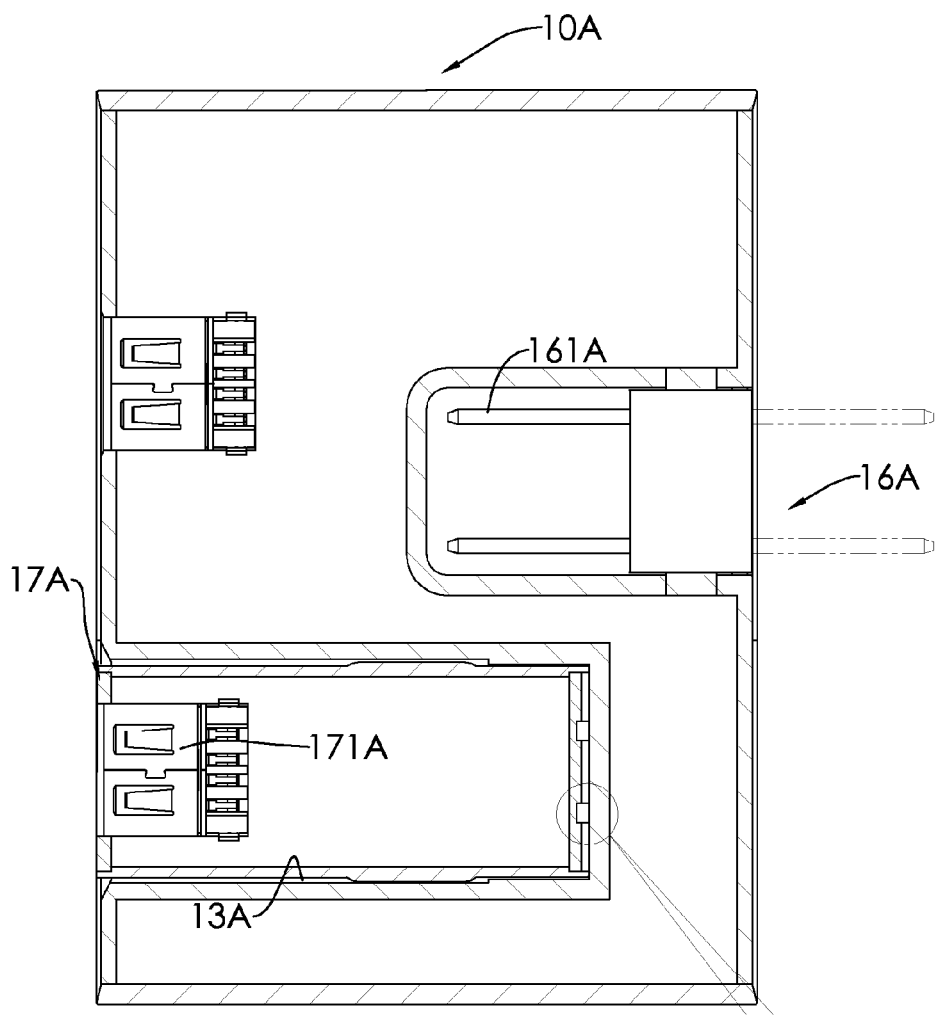
FIG. 5 is a top view in partial section of another embodiment of a storage case in accordance with the present invention.
Figure 5A:
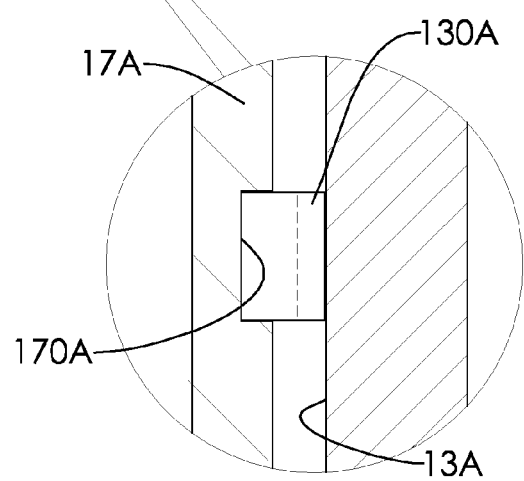
FIG. 5A is a partial enlarged view of the storage case in FIG. 5.

With reference to FIGS. 5 and 5A, in another embodiment based on the foregoing embodiment, the storage case does not have a car charger, but has an emergency charger 17A mounted in the second receiving recess 13A. The second receiving recess 13A has a recess surface and at least one charging terminal 130A. Each one of the at least one charging terminal 130A is a resilient metal sheet, is mounted on the recess surface of the second receiving recess 13A and is electrically connected to the first transformer inside the first case 10A to make the charging terminal 130A and the first plug 16A electrically connected with each other. Preferably, the second receiving recess 13A has two charging terminals 130A arranged at an interval. The emergency charger 17A has a Li-polymer battery mounted therein. One end of the emergency charger 17A has at least one power terminal 170A. Each one of the at least one power terminal 170A is a metal sheet, is formed in an end surface of the emergency charger 17A and corresponds to and electrically contacts one of the at least one charging terminal 130A. Preferably, the emergency charger 17A has two power terminals 170A arranged at an interval. The other end of the emergency charger 17A has a second receptacle 171A. The Li-polymer battery is electrically connected to the at least one power terminal 170A and the second receptacle 171A.

The first plug 16A can be plugged into a mains socket to recharge the Li-polymer battery of the emergency charger 17A through the first transformer. Therefore, when the electronic device needs to be charged and the electronic device user is outdoors and is not in a car, the built-in charging plug or the external power line of the electronic device can be connected to the second receptacle 171A of the emergency charger 17A for charging thereof.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. A storage case comprising:
  a first case including
    a connecting surface;
    two first connecting parts respectively formed on two sides of the connecting surface;
    a first receptacle formed in the first case; and
    a first plug pivotally mounted on the first case and electrically connected to the first receptacle;
  a second case detachably mounted on the first case and including
    a chamber defined inside the second case and having an open top being able to be sealed by the connecting surface of the first case;
    two sides; and
    two second connecting parts respectively formed on the sides of the second case adjacent to the open top thereof and detachably connected to the first connecting parts of the first case; and
  a third case detachably mounted on the first case adjacent to the second case and including a chamber defined inside the third case and having an open top being able to be sealed by the connecting surface of the first case;
two sides; and
two third connecting parts respectively formed on the sides of the third case adjacent to the open top thereof and detachably connected to the first connecting parts of the first case.

2. The storage case as claimed in claim 1, wherein the first case further includes
a second receiving recess formed in the first case; and
a car charger detachably mounted in the second receiving recess, one end of the car charger having a second plug and the other end of the car charger having a second receptacle electrically connected to the second plug.

3. The storage case as claimed in claim 1, wherein the first case further includes
a second receiving recess formed in the first case and having a recess surface and at least one charging terminal mounted on the recess surface thereof and electrically connected to the first plug; and
an emergency charger mounted in the second receiving recess and having a Li-polymer battery mounted therein, one end of the emergency charger having at least one power terminal corresponding to and electrically contacting the at least one charging terminal and the other end of the emergency charger having a second receptacle, the Li-polymer battery electrically connected to the at least one power terminal and the second receptacle.

4. The storage case as claimed in claim 1, wherein
one of the first connecting parts of the first case has an elongated protrusion having an axis and the other first connecting part of the first case has two elongated protrusions separated at an interval and having an axis, the two axes of the first connecting parts are parallel to each other;
each second connecting part of the second case has an elongated groove for slidably receiving at least one corresponding elongated protrusion of a corresponding first connecting part of the first case; and
each third connecting part of the third case has an elongated groove for slidably receiving at least one corresponding elongated protrusion of a corresponding first connecting part of the first case.

5. The storage case as claimed in claim 2, wherein
one of the first connecting parts of the first case has an elongated protrusion having an axis and the other first connecting part of the first case has two elongated protrusions separated at an interval and having an axis, the two axes of the first connecting parts are parallel to each other;
each second connecting part of the second case has an elongated groove for slidably receiving at least one corresponding elongated protrusion of a corresponding first connecting part of the first case; and
each third connecting part of the third case has an elongated groove for slidably receiving at least one corresponding elongated protrusion of a corresponding first connecting part of the first case.

6. The storage case as claimed in claim 3, wherein
one of the first connecting parts of the first case has an elongated protrusion having an axis and the other first connecting part of the first case has two elongated protrusions separated at an interval and having an axis, the two axes of the first connecting parts are parallel to each other;
each second connecting part of the second case has an elongated groove for slidably receiving at least one corresponding elongated protrusion of a corresponding first connecting part of the first case; and
each third connecting part of the third case has an elongated groove for slidably receiving at least one corresponding elongated protrusion of a corresponding first connecting part of the first case.

7. The storage case as claimed in claim 4, wherein
the first case includes a first receiving recess formed in the connecting surface of the first case and having
two opposite recess surfaces; and
two pivot holes defined respectively in the recess surfaces of the first receiving recess; and
the first plug is pivotally mounted in the first receiving recess and has two prongs mounted on a rotary base having
two opposite surfaces; and
two pivots respectively projecting from the surfaces of the rotary base and pivotally received in the pivot holes of the first receiving recess so as to make the prongs disposed in or protruding out of the first receiving recess.

8. The storage case as claimed in claim 5, wherein
the first case includes a first receiving recess formed in the connecting surface of the first case and having
two opposite recess surfaces; and
two pivot holes defined respectively in the recess surfaces of the first receiving recess; and
the first plug is pivotally mounted in the first receiving recess and has two prongs mounted on a rotary base having
two opposite surfaces; and
two pivots respectively projecting from the surfaces of the rotary base and pivotally received in the pivot holes of the first receiving recess so as to make the prongs disposed in or protruding out of the first receiving recess.

9. The storage case as claimed in claim 6, wherein
the first case includes a first receiving recess formed in the connecting surface of the first case and having
two opposite recess surfaces; and
two pivot holes defined respectively in the recess surfaces of the first receiving recess; and
the first plug is pivotally mounted in the first receiving recess and has two prongs mounted on a rotary base having
two opposite surfaces; and
two pivots respectively projecting from the surfaces of the rotary base and pivotally received in the pivot holes of the first receiving recess so as to make the prongs disposed in or protruding out of the first receiving recess.

10. The storage case as claimed in claim 7, wherein the chamber of the second case receives a reel block having
a top surface;
multiple positioning segments; and
a positioning recess formed in the top surface of the reel block.

11. The storage case as claimed in claim 8, wherein the chamber of the second case receives a reel block having
a top surface;
multiple positioning segments; and
a positioning recess formed in the top surface of the reel block.

12. The storage case as claimed in claim 9, wherein the chamber of the second case receives a reel block having a top surface;

multiple positioning segments; and a positioning recess formed in the top surface of the reel block.

13. The storage case as claimed in claim 10, wherein the chamber of the third case has a chamber surface; and a reel unit having multiple protrusions extending from the chamber surface of the chamber and each protrusion having a top positioning segment.

14. The storage case as claimed in claim 11, wherein the chamber of the third case has a chamber surface; and a reel unit having multiple protrusions extending from the chamber surface of the chamber and each protrusion having a top positioning segment.

15. The storage case as claimed in claim 12, wherein the chamber of the third case has a chamber surface; and a reel unit having multiple protrusions extending from the chamber surface of the chamber and each protrusion having a top positioning segment.

* * * * *